United States Patent [19]
Schultz et al.

[11] Patent Number: 5,544,010
[45] Date of Patent: Aug. 6, 1996

[54] PORTABLE ELECTRONIC DEVICE DOCKING SYSTEM

[75] Inventors: Darald R. Schultz, Cedar Rapids; Arvin D. Danielson, Solon; Alan G. Bunte, Cedar Rapids; Richard A. Sherman, Toddville; Robert B. Jaeger, Swisher, all of Iowa

[73] Assignee: Norand Corporation, Cedar Rapids, Iowa

[21] Appl. No.: 423,239

[22] Filed: Apr. 17, 1995

Related U.S. Application Data

[62] Division of Ser. No. 275,884, Jul. 15, 1994, Pat. No. 5,408,382, which is a continuation of Ser. No. 958,873, Oct. 8, 1992, abandoned, which is a continuation-in-part of Ser. No. 880,452, May 8, 1992, abandoned, which is a continuation-in-part of Ser. No. 818,761, Jan. 10, 1992, abandoned, which is a continuation-in-part of Ser. No. 558,895, Jul. 25, 1990, abandoned.

[51] Int. Cl.$^6$ .................................. G06F 1/16; H05K 7/10
[52] U.S. Cl. .................................................. 361/686
[58] Field of Search ......................... 364/708.1; 439/638, 439/928; 361/686, 679–685, 724–727, 741, 756; 312/223.1

[56] References Cited

U.S. PATENT DOCUMENTS

| | | | |
|---|---|---|---|
| 4,345,147 | 8/1982 | Aaron et al. | 364/708.1 X |
| 4,794,381 | 12/1988 | Iwai | 345/905 X |
| 5,030,128 | 7/1991 | Herron et al. | 364/708.1 |
| 5,041,924 | 8/1991 | Blackborow et al. | 361/685 X |
| 5,105,335 | 4/1992 | Honda | 361/679 |
| 5,133,076 | 7/1992 | Hawkins et al. | 364/709.09 X |
| 5,186,646 | 2/1993 | Pederson | 361/686 X |
| 5,209,583 | 5/1993 | Lewis et al. | 361/683 X |
| 5,227,953 | 7/1993 | Lindberg et al. | 361/686 |
| 5,290,178 | 3/1994 | Ma | 361/686 X |

*Primary Examiner*—Michael W. Phillips
*Attorney, Agent, or Firm*—McAndrews, Held & Malloy, Ltd.

[57] ABSTRACT

An improved device for docking a first electrical apparatus, having a first apparatus connector, such as a portable interchangeable data terminal, to a second electrical apparatus having a second apparatus connector, such as a vehicle mount. The device includes a portable dock for selectively receiving the data terminal. The dock includes a laterally extending base having a first dock connector, a second dock connector, and first guides extending transversely from each end of the base. Similarly, the second electrical apparatus has transversely extending second guides. The first guides are configured to operably guide the first dock connector to matingly connect with the first apparatus connector as the first apparatus is received by the dock and, similarly, the second guides are configured to operably guide the second dock connector to matingly connect with the second apparatus connector as the dock is received by the second electrical apparatus, such that information is processable between the first electrical apparatus and the second electrical apparatus.

6 Claims, 9 Drawing Sheets

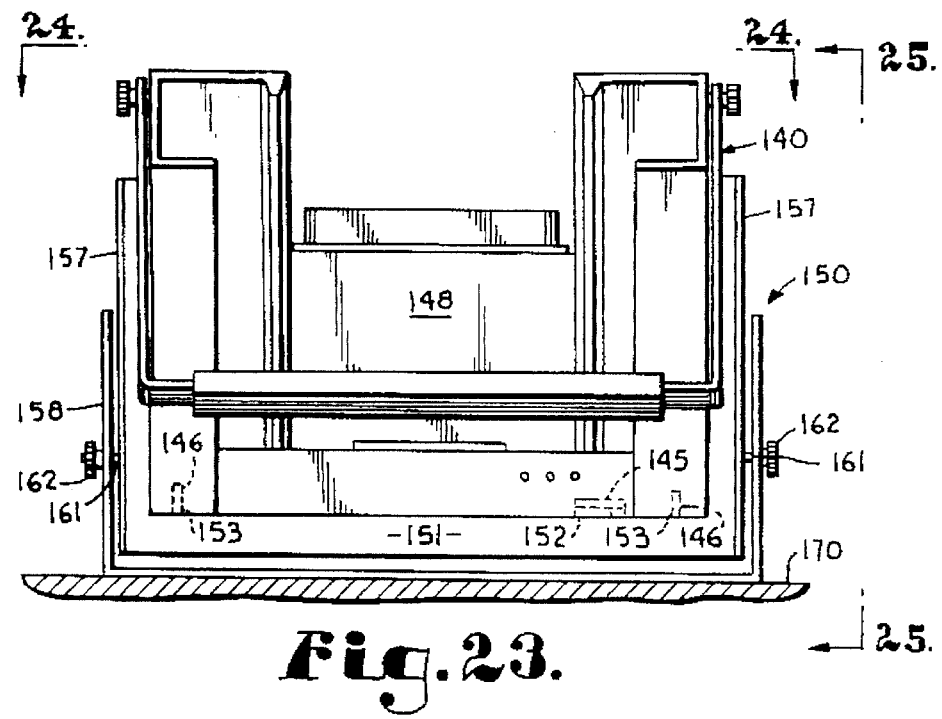
Fig. 23.
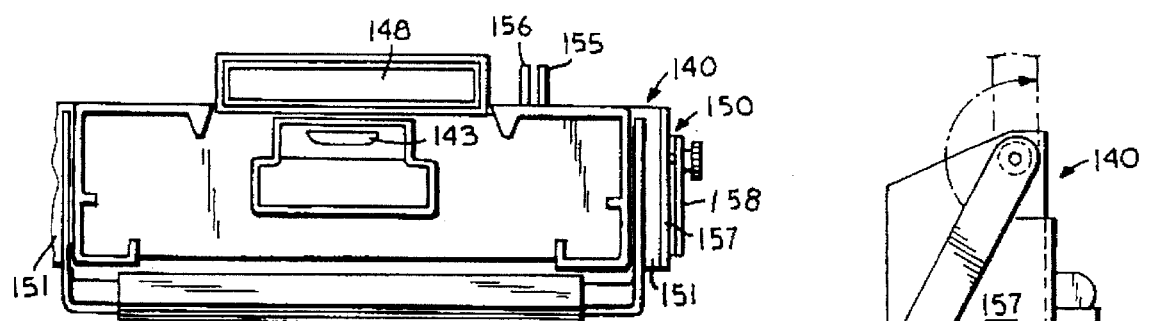
Fig. 24.
Fig. 25.
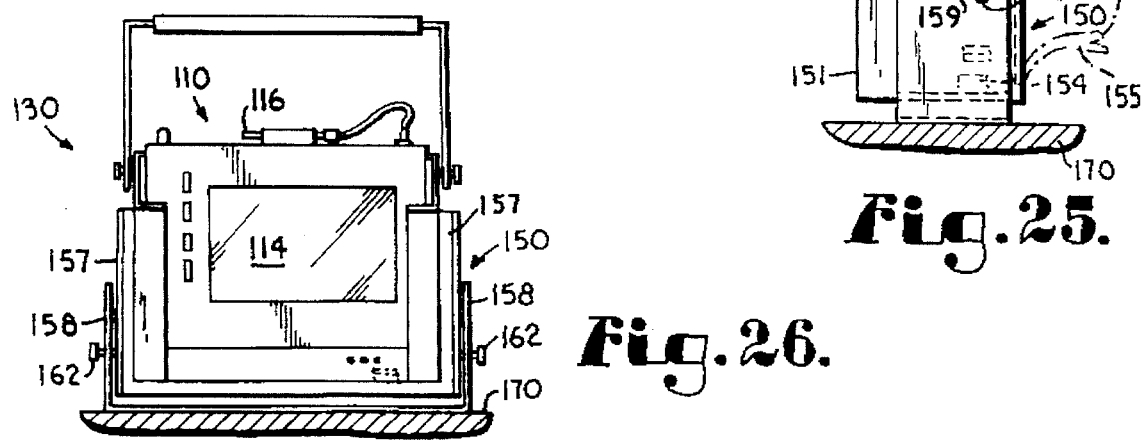
Fig. 26.

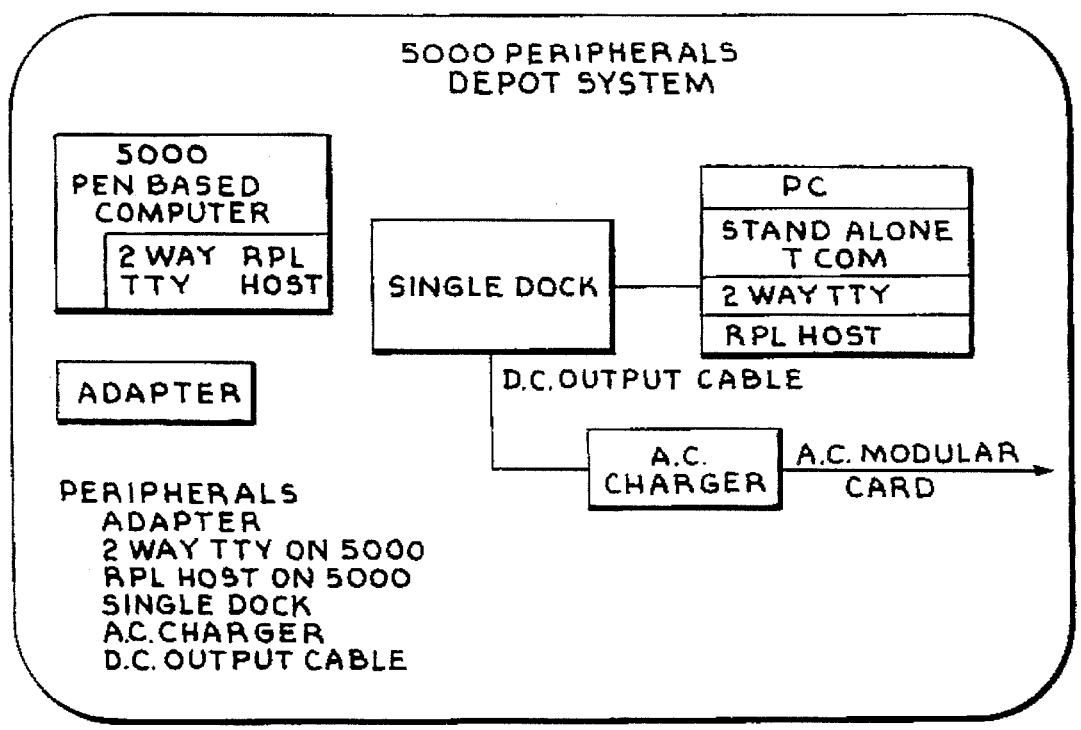
Fig.29.
Fig.30.
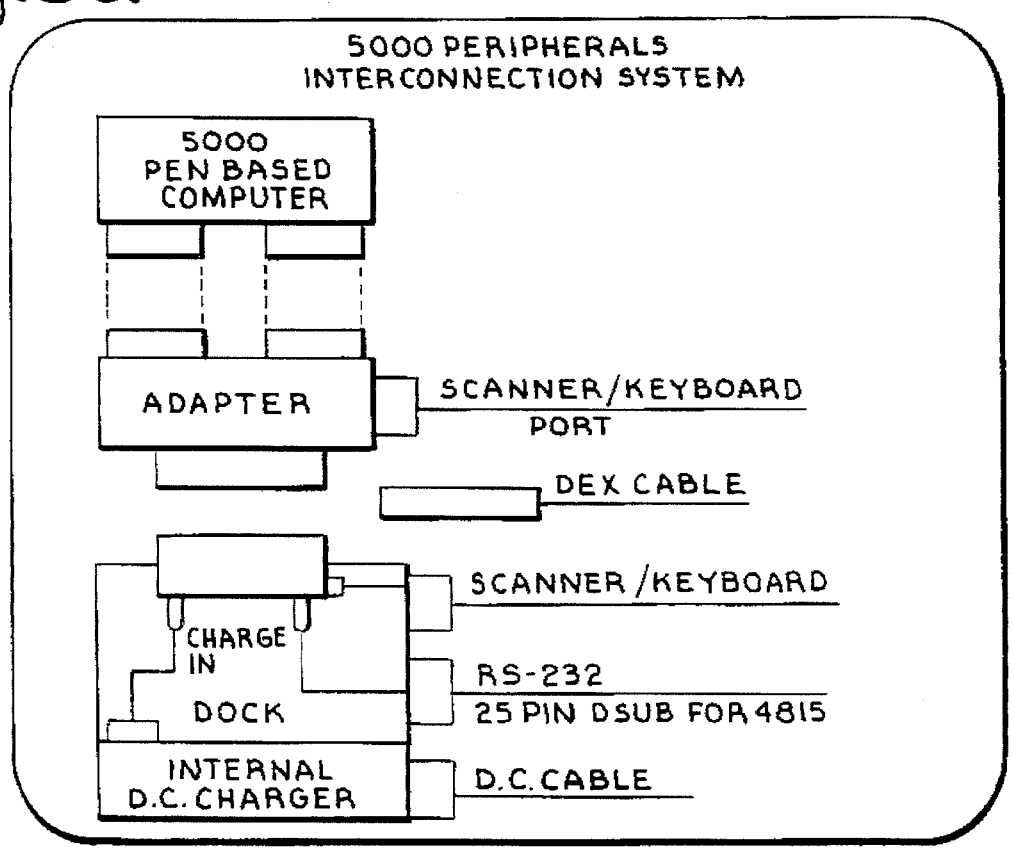

PORTABLE ELECTRONIC DEVICE DOCKING SYSTEM

This application is a divisional of application Ser. No. 08/275,884, filed Jul. 15, 1994, by D. Schultz et al., now U.S. Pat. No. 5,408,382, which is a continuation of application Ser. No. 07/958,873, (Attorney Docket No. 6837BB), filed Oct. 8, 1992, by D. Schultz et al., now abandoned, which is a continuation-in-part of application Ser. No. 07/880,452, filed May 8, 1992, by D. Schultz et at., now abandoned, which was a continuation-in-part of application Ser. No. 07/818,761, filed Jan. 10, 1992 by D. Schultz et al., now abandoned, which is a continuation-in-part of application Ser. No. 07/558,895, filed Jul. 25, 1990 by Alan G. Bunte et al., now abandoned.

INCORPORATION BY REFERENCE

The above referred to related applications, together with PCT Application PCT/US91/05234, filed Jul. 24, 1991 are incorporated herein by reference in their entirety, and hereby are made a part of this application.

1. Technical Field

The present invention relates generally to a modular portable printer and more particularly to such a printer having interchangeable computer terminals pivotally attached thereto and other interchangeable components for attachment thereto.

2. Background Art

Hand-held terminals for receiving, storing and transmitting information typically do not have printers attached thereto. On the other hand, certain devices such as calculators often do have a printer built in to the same housing as the calculator itself. There are so many different hand-held devices, some of which need to eventually be connected to printers and others which do not. The industry has generally designed terminals or the like to meet each different customer's needs. This has resulted in thousands of products which are separately designed and manufactured and which do not share common parts with other similar products.

The result has been higher manufacturing costs and consequently a higher cost to the consumer than would be possible if some sort of modularity or an interchange of common parts could be used. Furthermore, if the customer decides to use different equipment, then this would often mean scrapping the previously used equipment and purchasing entirely new equipment.

Consequently, there is a need for a modular terminal and printer concept which is configurable to the customers' needs and expandable by still using the same basic parts, but interchangeably adding other parts thereto as desired.

DISCLOSURE OF THE INVENTION

The present invention relates generally to a modular portable printer and more particularly to a printer frame having a printer attached thereto and having interchangeable computer terminals of various types, removably and pivotally attached to the frame.

An object of the present invention is to provide an improved mobile merchandising apparatus.

Another object of the present invention is to provide a printer frame which can accept various sizes of printers and various terminals.

A still further object of the present invention is to provide a printer frame which can be connectable to various types of terminals such as a docking unit for a standard hand-held terminal, a touch-screen device, a standard hand-held computer such as a Hewlett-Packard 95XL or the like, a touch-screen display, a pen based clipboard-like display for various terminals with drop-in hard keys in either a vertical or horizontal format and with or without displays thereon, etc.

A still further object of the present invention is to provide a terminal receiving bottom which is capable of using radio frequency, SST or UHF signals, a modem, cellular telephone and/or RAM/ROM/cards or flash cards.

A further object of the present invention is to provide an expandable printer frame which can accept modular printers of various configurations and which can also accept terminals of various configurations.

Other objects, advantages, and novel features of the present invention will become apparent from the following detailed description of the invention when considered in conjunction with the accompanying drawings.

BRIEF DESCRIPTION OF THE DRAWINGS

FIG. 23 is a front elevational view of a portable dock and vehicle mounted for selectively receiving the pen-based terminal;

FIG. 24 is a top plan view thereof taken along line 24—24 of FIG. 23;

FIG. 25 is a side elevational view thereof taken along line 25—25 of FIG. 23;

FIG. 26 is a front elevational view similar to FIG. 23 but showing the pen-based terminal positioned in the portable dock with the portable dock handle in the raised position;

FIG. 29 is a schematic illustrating pen-based terminal peripherals developed for a depot system;

FIG. 30 is a schematic illustrating the interconnection system for the pen-based terminal and the terminal dock;

BEST MODE FOR CARRYING OUT THE INVENTION

Description of FIGS. 1–18

Figure 1:
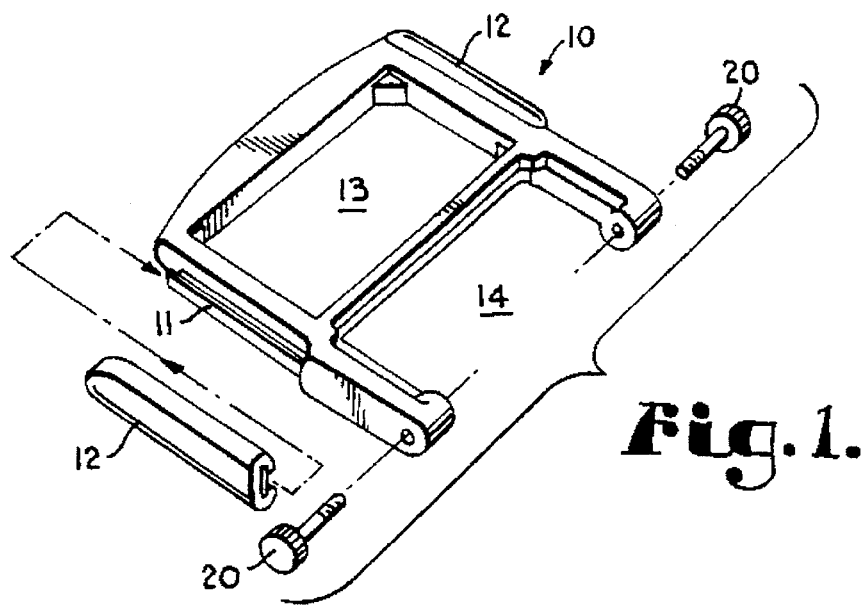
FIG. 1 is a perspective and partially exploded view of a printer frame constructed in accordance with the present invention.
Figure 2:
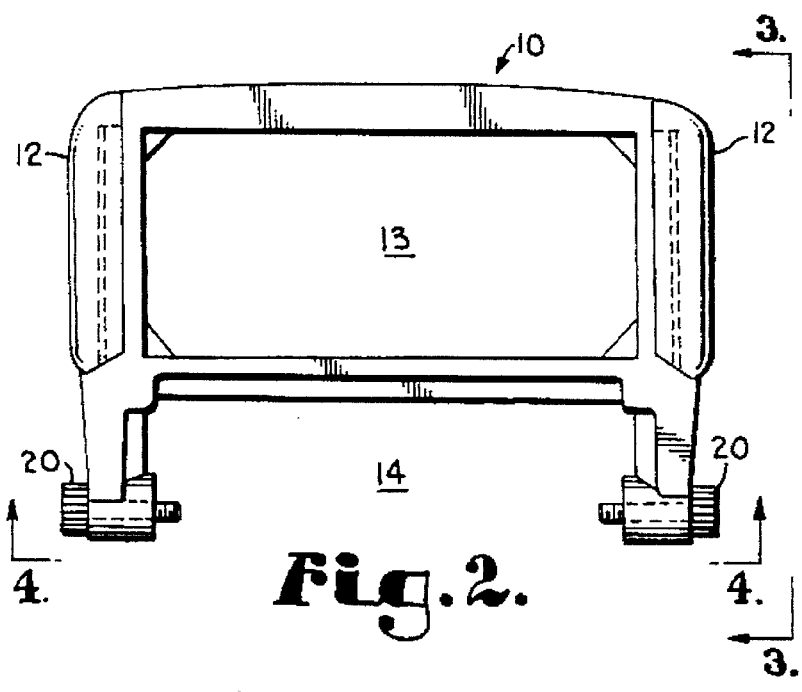
FIG. 2 is a top view of the printer frame shown in FIG. 1.
Figure 3:
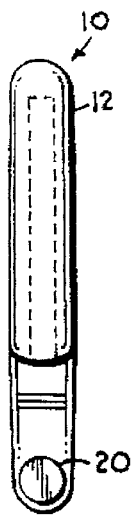
FIG. 3 is a side view taken along line 3—3 of FIG. 2.
Figure 4:
FIG. 4 is a front view taken along line 4—4 of FIG. 2.

Referring now to the drawings wherein like reference numerals designate identical or corresponding parts throughout the several views, FIG. 1 shows a printer frame (10) constructed in accordance with the present invention. The sides of the frame (10) have elongated, dovetail in cross section, portions (11) so that handles (12), which can contain re-chargeable batteries, are selectively attached to or removed from the frame (10). An opening (13) is formed for receiving a printer and an opening (14) is formed for receiving a computer terminal or the like.

Figure 5:
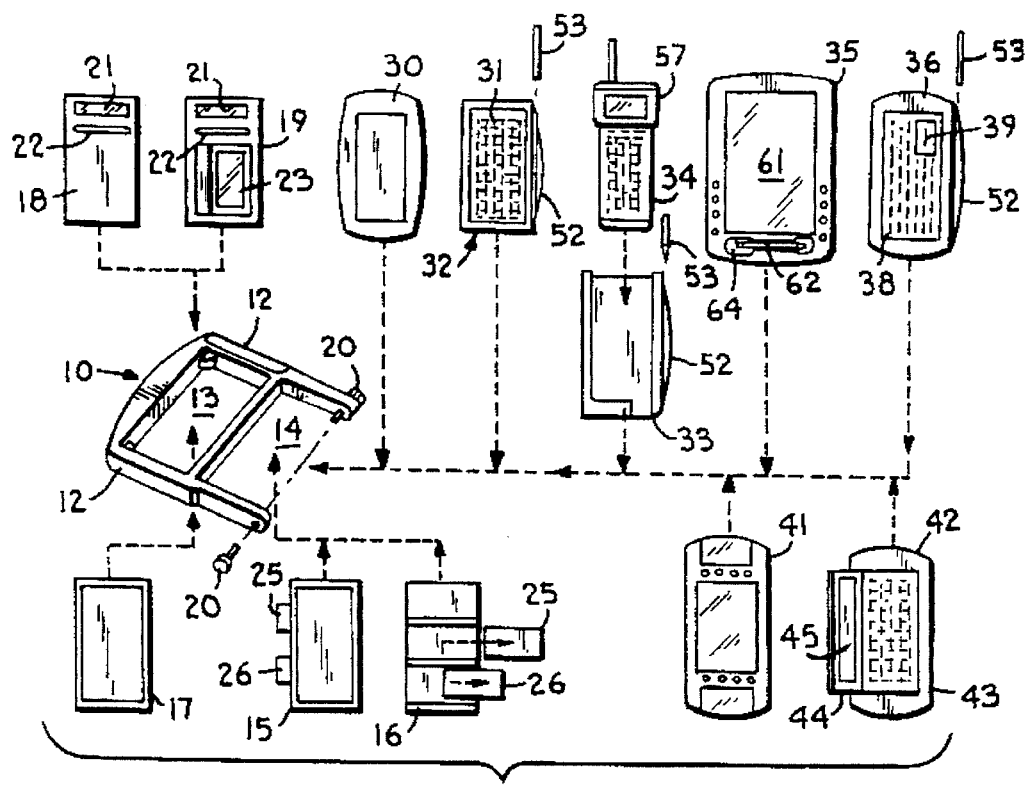
FIG. 5 is a schematic view showing the printer frame in perspective and showing some of the printer configurations and terminal configurations which can be attached thereto.

Referring to FIG. 5, it is noted that the frame (10) will receive a printer back (17) and a printer top (18) or (19). The printer tops have latches (21) thereon and two-inch paper slots (22) thereon, although the printer top (18) could have a four-inch paper slot oriented at 90° with respect to the paper slot (22) shown in FIG. 5. The printer top (19) has a terminal display (23) thereon which may be used when the terminal itself does not have a display thereon. Similarly, when the terminal to be used has its own display, then the printer top (18) would be used.

A printer bottom (15) or (16) can be pivotally attached to the printer frame (10) by threaded fasteners (20). A RAM card (25) and a ROM card (26) are receivable in the terminal bottoms (15) or (16). FIG. 5 also shows interchangeable terminal tops (30), which can have a drop-in keyboard (31), top (32) which can have a drop-in keyboard (31), a docking unit (33), which can accept a hand-held terminal (34), a pen-based tote or clipboard-type device (35), a device (36) with magnetic card reader (52) and a drop-in keyboard (38) with display (39), a touch-screen device (41) and a top (42) for plugging in a standard computer (43) such as a Hewlett-Packard 95XL, or the like. All of these tops (30), (32), (33), (35), (36), (41) and (42) can all be plugged into the terminal bottom (16), for example.

Figure 6:
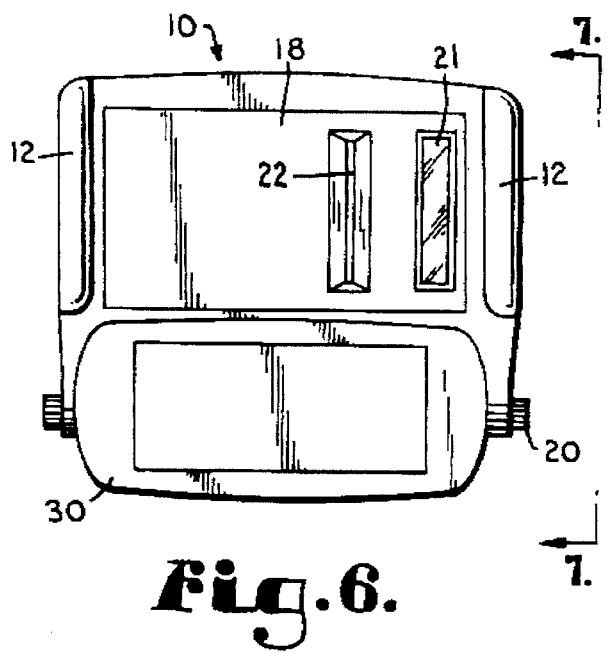
FIG. 6 is a top view of one printer and terminal configuration having a drop-in keyboard attached to a terminal bottom.

Referring now to FIG. 6, it is noted that the frame (10) having handles (12) with re-chargeable batteries disposed therein is pivotally attached to a bottom (16) of a terminal (30) with a touch screen. Threaded fasteners (20) achieve the pivotal attachment to frame (10) and are threadably attached to the bottom (16) through the openings in the frame (10) which are shown in FIG. 1.

Figure 7:
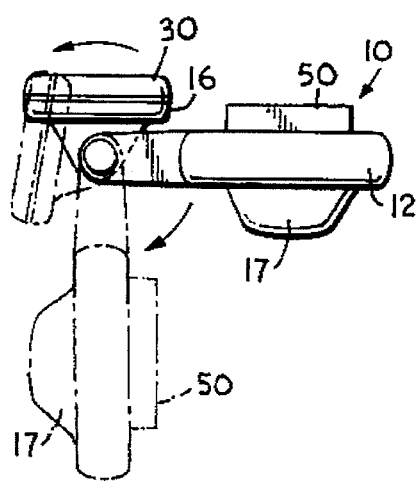
FIG. 7 is a view taken along 7—7 with the solid and dashed lines showing how the terminal can be adjusted with respect to the printer and how the printer can be adjusted with respect to the terminal.

Referring to FIG. 7, it is noted that the printer bottom (17) is attached to the frame (10) and referring back to FIG. 6, it is noted that the top (18) is also attached to the frame (10). This permits two-inch paper to be emitted from slot (22) and the plate (18) is held in place by a latch (21) as discussed above.

Referring again to FIG. 7, it is noted that when the printer is in the position shown in solid lines in FIG. 7, and the terminal (30) is in the position shown in dashed lines in FIG. 7, this would correspond to the device being used on a desk whereby the terminal (30) can be easily viewed and accessed and the paper (50) will pass out through the top of the printer slot (22). If, however, it is desired to carry the device around, it can be used in the position shown in solid lines in FIG. 7 wherein the user's arm is under the bottom portion (17) and grasping the right side of the printer frame as shown in FIG. 7 with the forearm under both the printer and the terminal (16) so that the other hand can access the terminal (30). Alternatively, to carry the device around and use it, the user can move the printer to the dashed line position shown in FIG. 7 while leaving the terminal (30) in the position shown in solid lines in FIG. 16. This permits the user to put one hand between the terminal (30) and the printer (18), i.e., through opening (14). In this way, the user can merely hold the terminal (30) with the printer hanging down.

Figure 17:
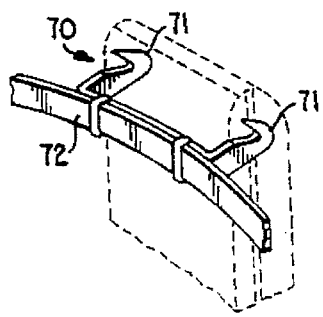
FIG. 17 is a hook device for attachment to a user's belt whereby the hooks hook over the threaded fasteners used to attach the terminal to the printer frame.
Figure 19:
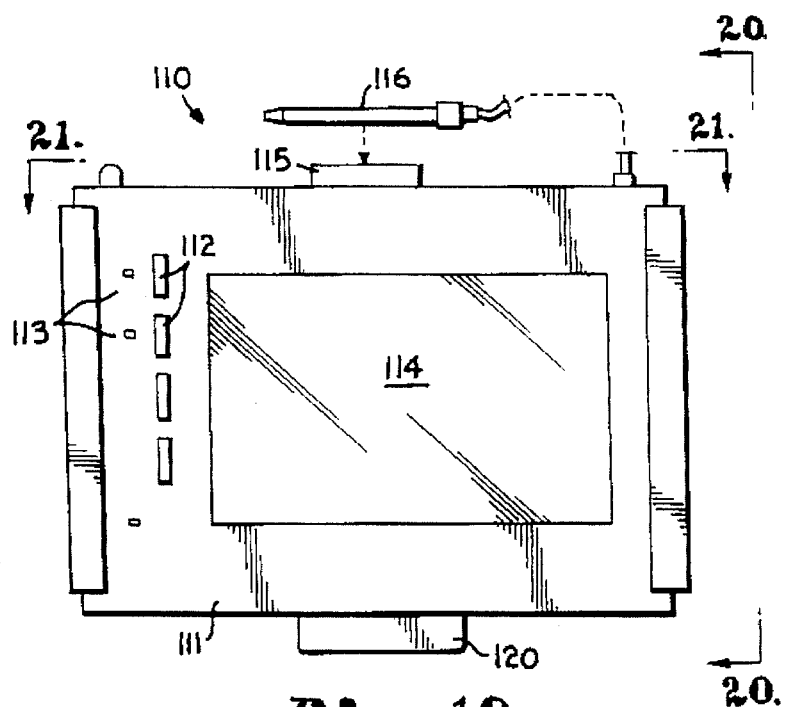
FIG. 19 is a front elevational view of a light pen-based computing terminal of the present invention.
Figure 20:
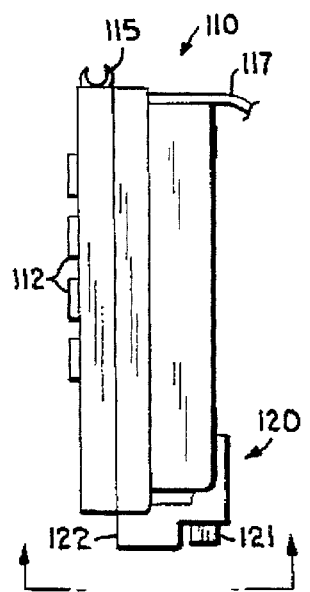
FIG. 20 is a side elevational view thereof taken along line 20—20 of FIG. 19.
Figure 21:
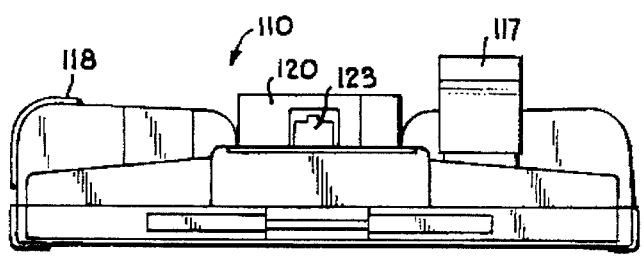
FIG. 21 is a top plan view thereof taken along line 21—21 of FIG. 19.
Figure 22:
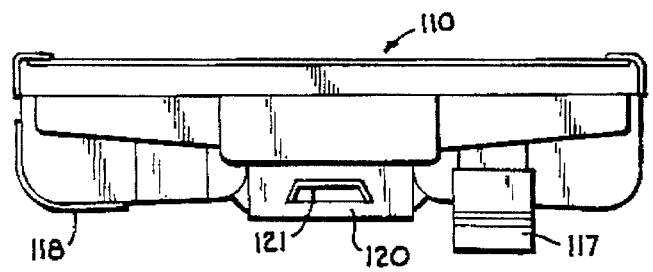
FIG. 22 is a bottom plan view thereof taken along line 22—22 of FIG. 20.
Figure 27:
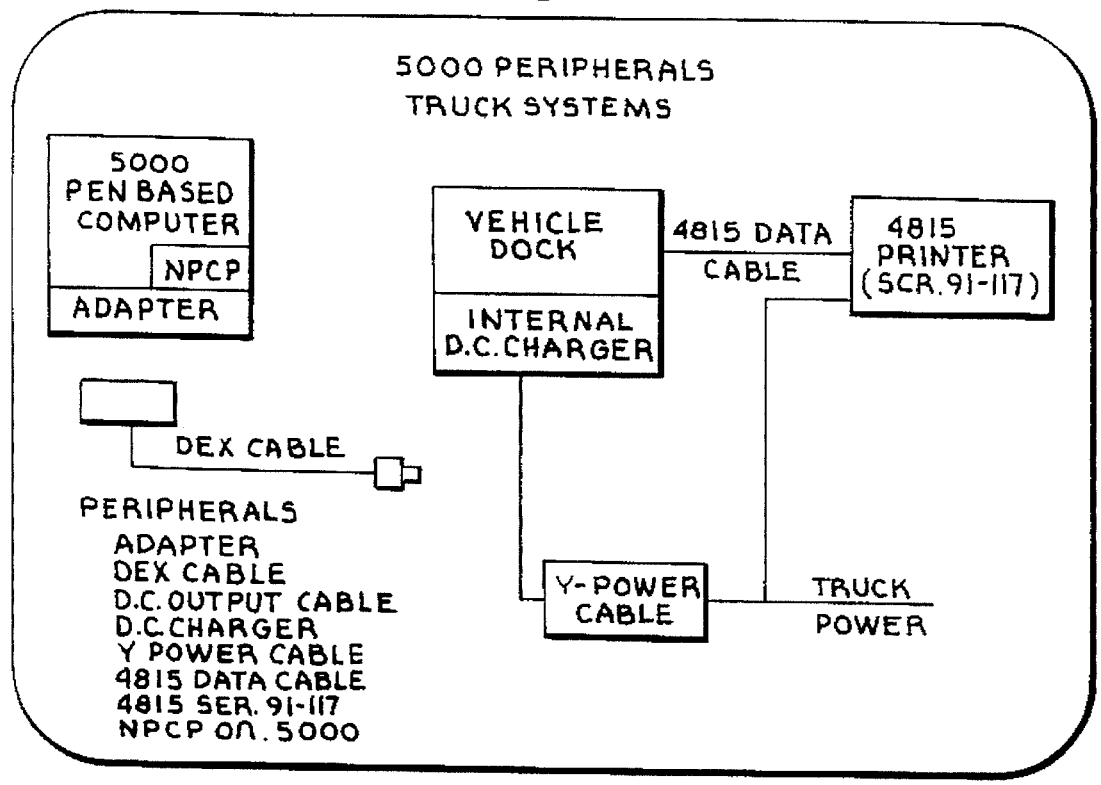
FIG. 27 is a schematic illustrating pen-based terminal peripherals developed for a truck system where the terminal dock communicates through an on-board printer.
Figure 28:
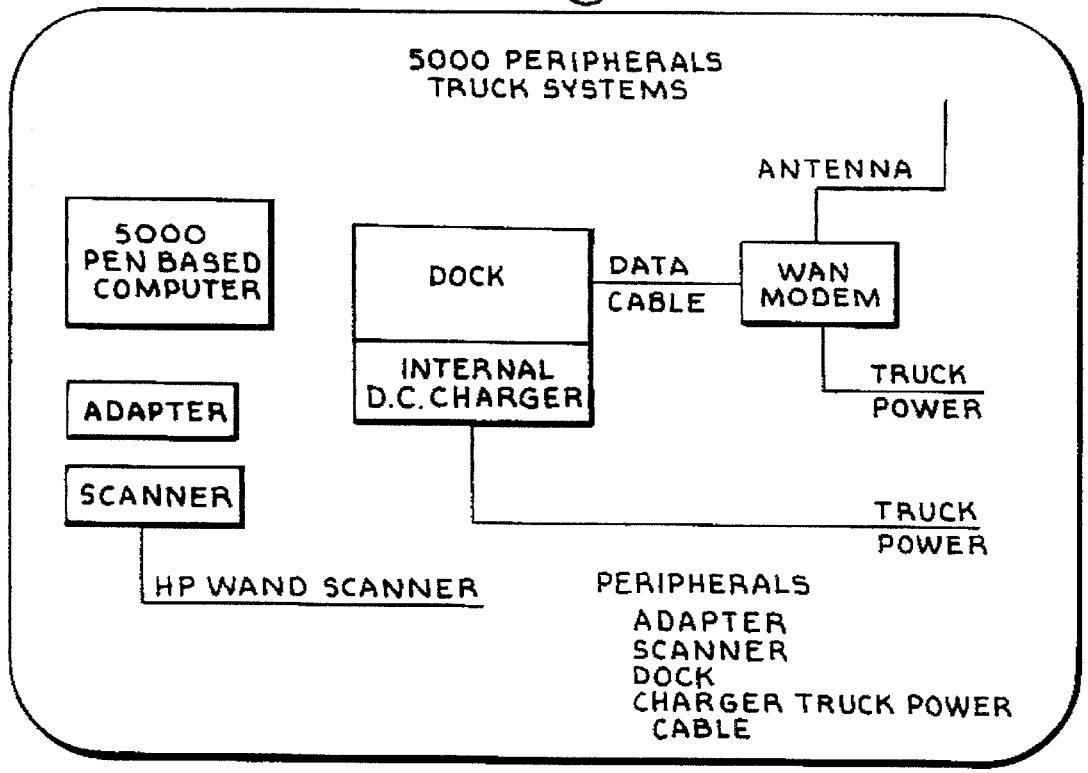
FIG. 28 is a schematic illustrating pen-based terminal peripherals developed for a truck system where the terminal dock communicates through a wide area network modem.

If it is desired to put the device shown in FIG. 7 on a person's belt, the belt loop device (70) shown in FIG. 17 can be used wherein the hooks (71) would go around the blank portion of threaded fasteners (20) between the head or handle thereof and the printer frame (10). It would also be desirable, during such use, for the printer to be oriented so that the paper (50) exits away from the person's body rather than toward it, whereby when viewing the device in FIG. 7 orientation with the printer extending down, the person would be on the left of the device with the person's belt (72) having the belt loop device (70) attached thereto. If the printer and terminal shown in FIG. 7 is to be mounted high on a shelf, for example in a van, then the printer would be oriented such that the paper tape (50) would extend downwardly and the terminal having bottom (16) thereon would then merely be positioned so that it is in clear view of the user.

Figure 8:
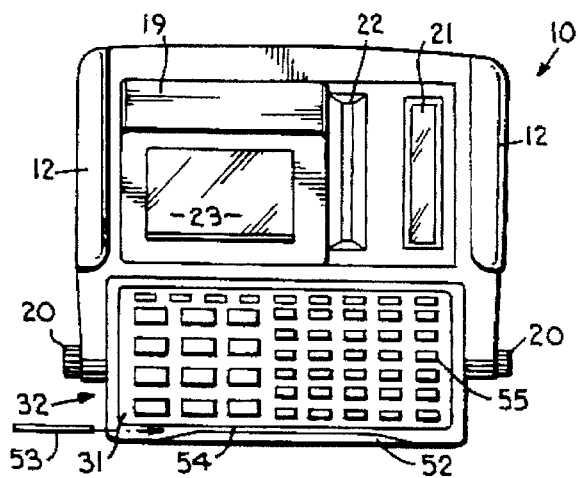
FIG. 8 is a top plan view of another configuration of the present invention showing the drop-in keyboard with hard keys and having the printer with a display-type top, rather than the top shown in FIG. 6.
Figure 14:
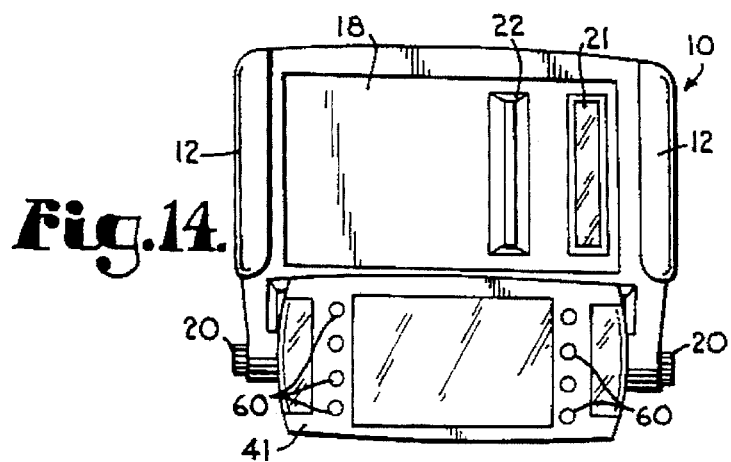
FIG. 14 is a top view of still another configuration showing a touch-screen display attached to a terminal back which is pivotally attached to the printer frame.

Referring now to FIG. 8, it is noted that the frame (10) has a printer top (19) with the display (23) thereon and a drop-in keyboard (31). It is to be understood that this drop-in keyboard (31) can have the keys oriented in the direction shown or they can be oriented 90° with respect thereto, depending upon the customer's desires. A magnetic card reader (52) is attached to the terminal (32) for reading credit cards (53) or the like by passing the credit card (53) through slot (54) in the magnetic card reader (52). Of course, the FIG. 8 structure can be oriented in any of the positions shown in FIG. 7, and of course, any position in between those positions shown in FIG. 7. The FIG. 8 drop-in keyboard (31) uses hard keys (55) rather than a touch screen as is shown in FIG. 14.

Figure 9:
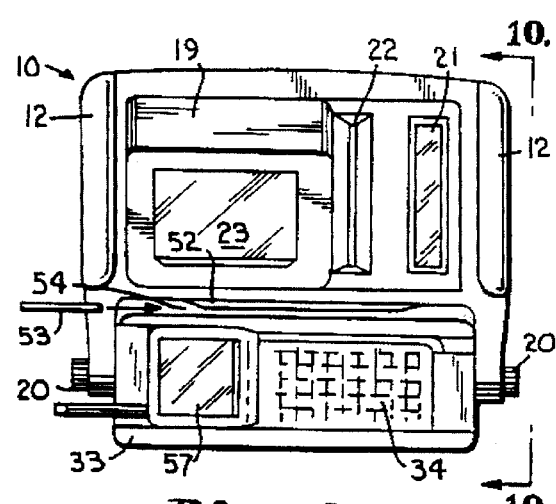
FIG. 9 is a view of a printer having a display top and a docking unit with a removable hand-held unit disposed therein.

Referring now to FIG. 9, it is noted that the frame (10) also has a top (19) with a display (23), but a docking unit (33) is rotatably attached thereto by threaded fasteners (20). This docking unit has a hand-held terminal (34) which snaps into place and automatically plugs into the printer when it is snapped into the slot in docking unit (33). This terminal (34) can be one like the Norand Model 1600, Model 1100 or Model 1000. The terminal (34) also has a display (57) so that the display (23) is somewhat of a duplication and the top (19) could be replaced by top (18) if desired; or if the terminal (34) does not have a display like (57), then the printer top (19) could be used instead.

Figure 10:
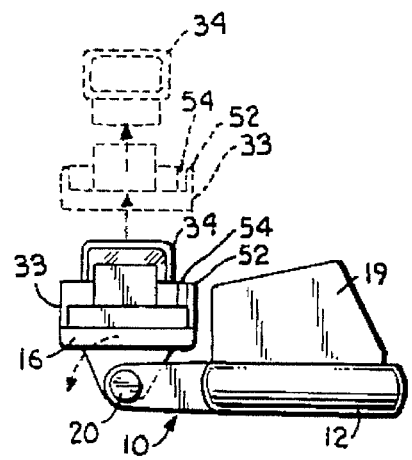
FIG. 10 is a view taken along line 10—10 of FIG. 9 and showing how the hand-held unit can be plugged into the docking unit and oriented in various positions as needed.
Figure 16:
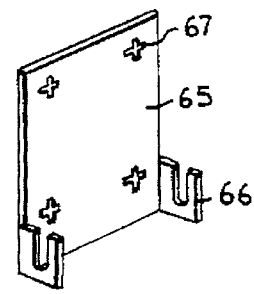
FIG. 16 is a bracket for attaching the printer frame and consequently the printer and terminal to a vehicle such as a van.

FIG. 10 shows a typical orientation of the frame (10) with respect to the docking unit (33), for example if it were used on a desk or laying on a seat of a van or the like. The device can be hand-held, it can be disposed on a belt as shown in FIG. 17, or it could have a shoulder strap or the like. As shown in FIG. 16, it could also be attached to a van by a bracket (65) having hooks (66) attached thereto and openings (67) for receiving fasteners which would go into the wall of a van or the like. Referring back to FIGS. 9 and 10, it is noted that the terminal (34) can be removed and used in the many conventional ways that such terminals are used, and when the printing capability is desired, it can be reinserted into the docking unit (34) as shown.

Figure 11:
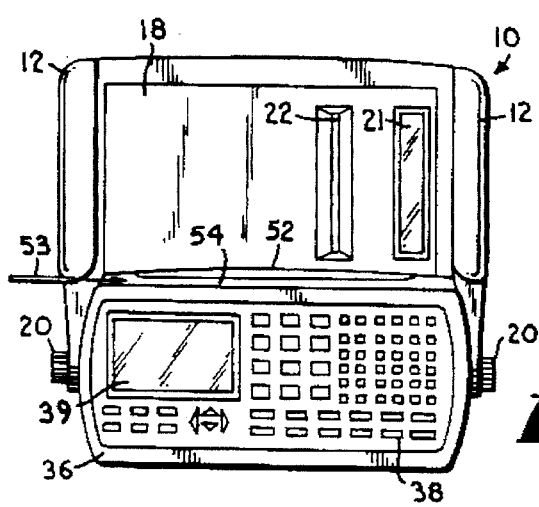
FIG. 11 is still another printer and terminal configuration wherein the terminal top is of the non-display variety and the drop-in keyboard has a display attached thereto.
Figure 18:
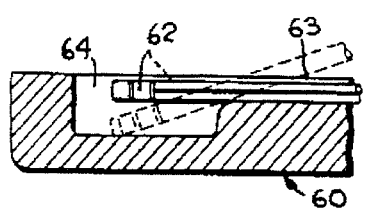
FIG. 18 is a cross sectional view taken along line 18—18 of FIG. 12 showing how the pen can be removed from its holder.

Referring now to FIG. 11, it is noted that the frame (10) has printer top (18) attached thereto and a top (36) is attached to the bottom (16), which is, in turn, rotatably attached by threaded fasteners (20) to the frame (10). A drop-in computer keyboard (38) having a display (39) thereon, is the option chosen in FIG. 11. A magnetic card reader (52) is also attached to the top (36) for reading credit cards (53).

Figure 12:
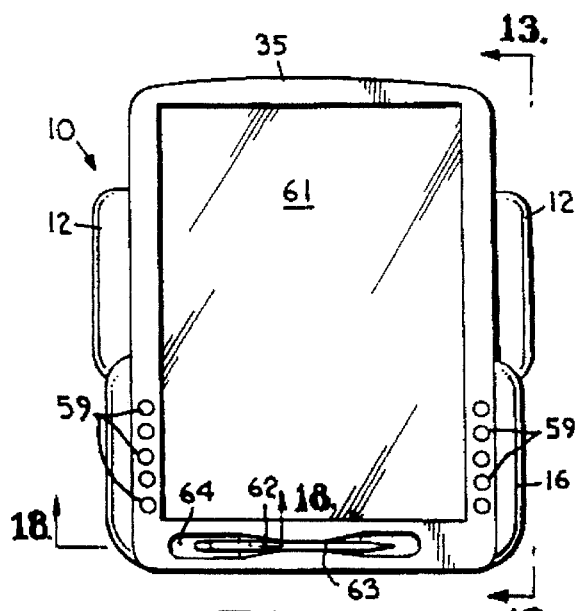
FIG. 12 is a top view of a pen-based tote board plugged into a terminal back which is pivotally attached to the printer frame.

Referring now to FIG. 12, it is noted that a pen-based tote board device (35) has a screen (61) thereon and a pen (62) disposed in a slot (63) having enlarged opening (64) on each end thereof. By pushing down on one end of the pen-like device (62), it will be tipped up to the dashed line position shown in FIG. 18 and can be removed to use on the screen (61). This manual way of entering information into the terminal (16) permits the device to be arm holdable, hand holdable and permits use for either left-handed or right-handed people. Buttons (59) on each side thereof can be used for shift functions or to bring up programs or the like and can be soft-labeled to add versatility to conform to what the customer desires.

Figure 13:
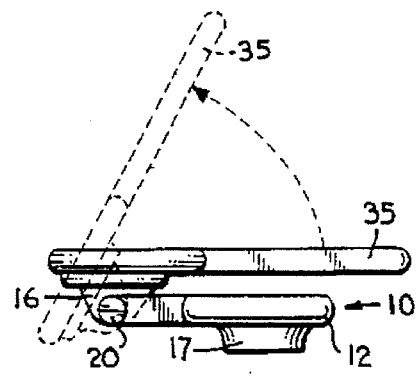
FIG. 13 is a view taken along line 13—13 of FIG. 12 and shows in dashed lines how the pen-based tote board can be pivoted with respect to the printer frame.

Referring to FIG. 13, it is noted that the device can be hand-held in the position shown in solid lines in FIG. 13 by one arm, while writing with the other arm of the user, or if the device is to be used on a desk or other surface like a desk, the tote board (35) can be tilted up to the dashed line position shown in FIG. 13. If it is desired to remove the tote board device (35) from the printer, the terminal can be removed from the printer and used as a tote board-type device and then reattached to the printer when printing capability is desired.

Referring now to FIG. 14, it is noted that the frame (10) has a top (18) attached thereto and a touch-screen display (41) is attached to the terminal bottom (16) shown in FIG. 5. The touch-screen device (41) is programmed so that by pushing one of the buttons (60) on each side of the touch-screen, the display will be oriented in one orientation or by pushing another one of buttons (60) in an orientation 90° from the first said orientation whereby if a person desires to use the device on a desk, attached to a van either at a low position or a high position, the display would typically be readable from the position shown in FIG. 14 where the letters and numbers would be upright. However, if it is desired to carry the device around, for example in the FIG. 7 position with the printer down and the person's hand through slot (14), or the device is to be worn on the belt (72) shown in FIG. 17, it may be desired to re-orient the display on touch-screen (41) 90° so that the top thereof is on one of the narrower sides of the touch-screen, rather than on the wider side of the touch-screen as previously described. Some of the function buttons (60) are also usable like the function buttons (59) whereby they can perform various shift functions or bring up various programs as desired.

Figure 15:
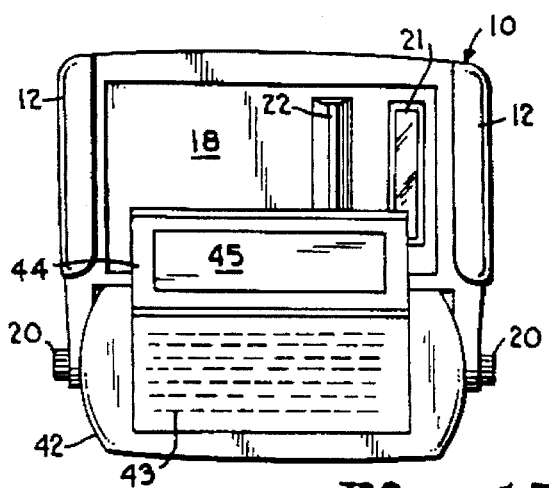
FIG. 15 is a top plan view of the printer frame having an adapter plate plugged into the terminal bottom and having a computer plugged into the adapter plate and connected to the printer.

Referring now to FIG. 15, it is noted that the printer frame (10) has a top (42) attached to the bottom (16) shown in FIG. 5 with an adapter plate for automatically plugging in a computer (43), such as a Hewlett-Packard 95XL or the like, having a pivoted lid (44) with a display (45) therein. Since the computer (43) has its own display (45), printer top (18) would be utilized therewith. Of course, the computer (43) can be removed and used independently, or when it is desired to have printer capability, it would be plugged in in the position shown in FIG. 15, into top (42) and bottom (16).

Description of FIGS. 19–30

FIGS. 19–22 show a pen-based terminal (110) which is another embodiment of the pen-based device (35) shown in FIGS. 5, 12 and 13. FIGS. 23–25 show a docking system (130) for use in conjunction with terminal (110). The docking system (130) is another embodiment of the dock (33) shown in FIGS. 5, 9 and 10. It is to be understood that the pen-based terminal (110) could be pivotally attached to the frame (10) (FIG. 1), or the pen-based terminal (110) could be received in the docking system (130) which could be pivotally attached to the frame (10) in a manner similar to that illustrated in FIGS. 12–13 and 9–10.

Referring now to FIGS. 19–22, the pen-based terminal (110) includes a front panel (111) having a number of function keys (112) and indicator lights (113). A display (114) extends over a large area of the front panel (111). A light pen clip (115) is carried on the top edge of the terminal (110) to receive and secure a light pen (116) in position when not in use to input data. A hand strap (117) extends from the top edge, over the back of the housing, then to the bottom edge of the terminal (110). A battery cover (118) encloses a section of the back of the housing that carries a rechargeable battery (not shown).

The vehicle mount (150) has a base (151) that carries a connector (152) and a pair of locator pins (153) that matingly engage a connector (145) and a locator openings (146)

of a portable dock (140). The base (151) houses a transition cable assembly (154) that operably interconnects a connector (152) to the power cable (155) and data cable (156) that extend from the base (151). Side panels (157) extend up from each side of the base (151) and pivotally attach to a U-shaped bracket (158) attached to a vehicle (170). An arcuate slot (159) in each of the upwardly extending arms of the bracket (158) receives a threaded rod (161) extending from each of the side panels (157). A locking wheel (162) is attached to the portion of each rod (161) extending out from the arms of the bracket (158).

Although a bracket (158) is typically mounted in a delivery vehicle (170), it is understood that it could likewise be located in a home office, or even a depot environment with multi-dock capability. The vehicle mount (150) could, for example, be configured to quickly detach from the bracket (158) and be used in a home office so that only one set of charge control systems, indicators, etc. would be required. As seen by reference to FIG. 25, the vehicle mount (150) is pivotally movable through the range of the arcuate slot (159) to conveniently position the docking system (130) for the user. Once positioned as desired, the locking wheel (162) is tightened to secure the docking system (130) in position. The vehicle mount (150) selectively receives the portable dock (140) which in turn selectively receives the pen-based terminal (110).

The pen-based terminal (110) is operably connected to both the power cable (155) and the data cable (156) through a connector (121) of adapter (120) a connector 143 (see FIG. 29) and, the connector (145) of the portable dock (140), and the connector (152) of the vehicle mount (150). Attachment to alternative peripheral devices for processing information from and inputing information through the pen-based terminal (110) is illustrated in the schematics of FIGS. 27–30. A connector (123) is positioned on the adaptor and the docking system (130) is configured so that the scanner and DEX cables may remain connected to the pen-based terminal (110) when the terminal (110) is positioned in the portable dock (140). also, the charging system defaults to charge the battery in a terminal (110) first, and the then to charge the spare battery (148) in the portable dock (140).

Figure 31:
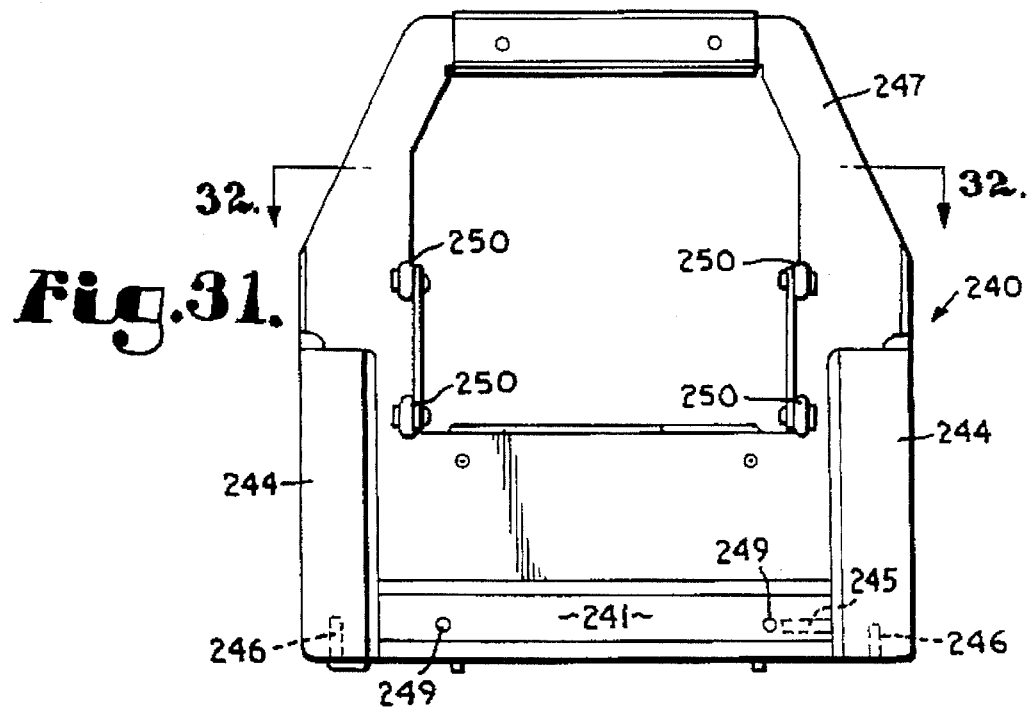
FIG. 31 is a front elevational view of an alternate embodiment of the portable dock shown in FIGS. 23–26, this embodiment includes roller guides to facilitate the insertion and removal of the terminal
Figure 32:
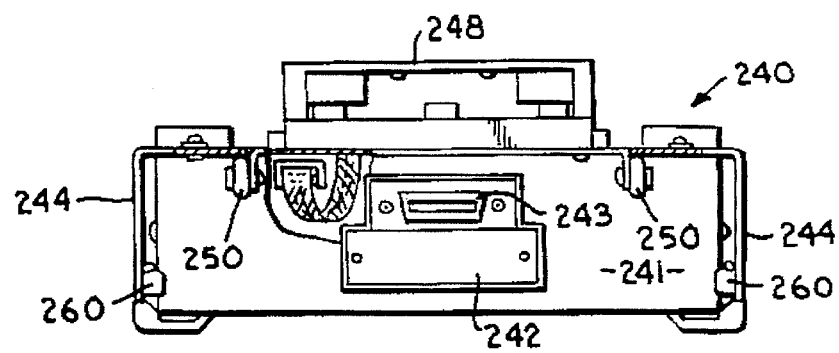
FIG. 32 is a top plan view taken along line 32—32 of FIG 31.
Figure 33:
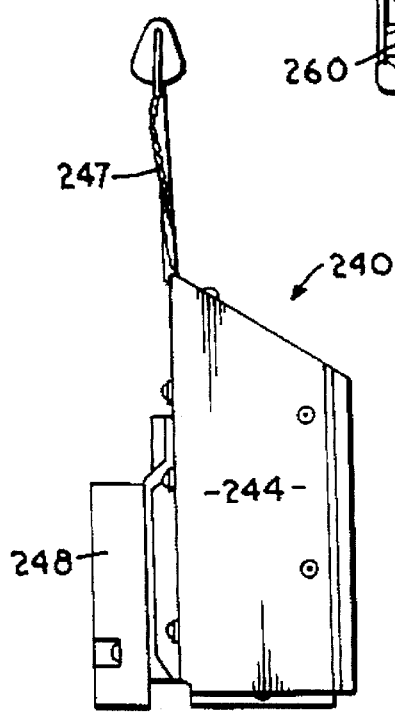
FIG. 33 is a side elevational view of the portable dock of FIGS. 31 and 32.

Description of FIGS. 31–33

FIGS. 31–33 show an alternate embodiment of the portable dock (140) shown in FIGS. 23–26. FIGS. 31–33 show a portable dock (240) having a base (241) that carries a guide (242) and a connector (243) that matingly receive the tab (122) and connector (121) of the terminal (110). Open channel members (244) extend up from each side of the base (241) to selectively receive the pen-based terminal (110). A connector (245) and locator openings (246) are carried on the underside of the base (241). A handle (247) extends up from and is inclined back from the rear of the channel members (244). A spare battery charge station (248) extends between the channel members (244) at the rear of the base (241). Indicator LEDS (249) are visible from the front of the base (241).

As best shown in FIGS. 31 and 32, the rear portion of each of the channel members (244) carries vertically aligned roller guides (250) disposed to contact the rear surface of the pen-based terminal (110). Also, as shown in FIG. 32, the central portion of each channel members (244) carries vertically aligned roller guides (260) disposed to contact the lateral edges of the terminal (110). The roller guides (250 and 260) facilitate the insertion and removal of the terminal (110) from the portable dock (240).

Accordingly, it will be appreciated that the preferred embodiments shown herein do indeed accomplish the aforementioned objects. Obviously, many modifications and variations of the present invention are possible in light of the above teachings. It is therefore to be understood that, within the scope of the appended claims, the invention may be practiced otherwise than as specifically described.

We claim:

1. A docking system comprising:
   (a) a first electrical apparatus having opposing first sides and a first electrical connector;
   (b) a second electrical apparatus having a pair of extending side panels and a second electrical connector;
   (c) a dock having:
      (1) a first connecting mechanism for physically and electrically connecting said dock to said first electrical apparatus wherein said first connecting mechanism is releasably and matingly engageable with said first electrical connector,
      (2) a second connecting mechanism for physically and electrically connecting said dock to said second electrical apparatus wherein said second connecting mechanism is electrically connected with said first connecting mechanism and is releasably and matingly engageable with said second electrical connector, and
      (3) a first guide mechanism for guiding said first connecting mechanism into said mating engagement with said first electrical connector wherein said guide mechanism includes a pair of opposing side pieces adapted to extend along said opposing first sides of said first electrical apparatus, and a second guide mechanism for guiding said second connecting mechanism into mating engagement with said second electrical connector; and
   (d) wherein said pair of extending side panels are adapted to extend along sides of said dock.

2. The docking system according to claim 1, wherein said second guide mechanism includes at least one set of locators comprising a cooperating pin and opening.

3. The docking system according to claim 1 wherein said first electrical apparatus includes a keyboard and said dock is adapted to provide operable access to said keyboard as said first electrical apparatus is connected to said dock.

4. The docking system according to claim 1 wherein said first electrical apparatus includes a scanner and said dock is adapted to provide operable access to said scanner as said first electrical apparatus is connected to said dock.

5. The docking system according to claim 1 wherein said first electrical apparatus includes a magnetic reader and said dock is adapted to provide operable access to said magnetic reader as said first electrical apparatus is connected to said dock.

6. The docking system according to claim 1 wherein said dock includes a battery.

* * * * *